United States Patent [19]

Dobras

[11] 3,891,829

[45] June 24, 1975

[54] CODED RECORDS, METHOD OF MAKING SAME AND METHOD AND AN APPARATUS FOR READING CODED RECORDS

[75] Inventor: Bruce W. Dobras, Dayton, Ohio

[73] Assignee: Monarch Marking Systems, Inc., Dayton, Ohio

[22] Filed: Aug. 29, 1973

[21] Appl. No.: 392,413

[52] U.S. Cl..... 235/61.11 E; 235/61.12 N; 250/566

[51] Int. Cl...... G06k 7/10; G06k 19/08; G08c 9/06

[58] Field of Search...235/61.11 E, 61.12 R, 61.12 N; 250/555, 566

[56] References Cited

UNITED STATES PATENTS

| | | | |
|---|---|---|---|
| 2,268,498 | 12/1941 | Bryce | 235/61.11 E |
| 2,704,634 | 3/1955 | Rauch | 235/61.12 R |
| 2,953,300 | 9/1960 | O'Brian et al. | 235/61.12 R |
| 3,663,801 | 5/1972 | Wahli et al. | 235/61.11 E |
| 3,684,869 | 8/1972 | Reiter | 235/61.12 M |

*Primary Examiner*—Daryl W. Cook
*Attorney, Agent, or Firm*—Mason, Kolehmainen, Rathburn & Wyss

[57] ABSTRACT

Uniformly-spaced timing marks having an optical characteristic are printed on record material. Bar-coded characters having a different optical characteristic are also printed on the record material in superimposed relationship to the timing marks. The bar-code characters may be randomly positioned with respect to the timing marks and to each other. Both the timing marks, which may be called clock bars, and the data bars which comprise the coded characters are then optically scanned with a single scanning stylus. The clock bars provide a time-base reference for the scanning of the data bars and can compensate for the speed at which the record is manually scanned. More specifically, the presence or absence of a data bar is determined at selected leading and trailing edges of the clock bars. The thickness of the bar-code elements may vary considerably as a result of non-uniform printing without causing errors in the scanning.

19 Claims, 11 Drawing Figures

CODED RECORDS, METHOD OF MAKING SAME AND METHOD AND AN APPARATUS FOR READING CODED RECORDS

BACKGROUND OF THE INVENTION

1. Field of the Invention

The present invention relates to machine-readable records, and more particularly to records which bear a bar code that may be scanned with a stylus or scanner. The invention also relates to the design of equipment for interpreting the information gathered by such a stylus or scanner.

2. Brief Description of the Prior Art

Numerous schemes have been proposed in the past whereby machine-readable indicia may be placed upon goods or inventory. Such indicia may be used both in ascertaining the price of goods at a checkout counter or the like and in maintaining an accurate record of the goods or inventory on hand. In order to provide a workable system, it is necessary that the apparatus which reads the indicia be designed to be used by inexperienced employees with a minimum of training. Systems of this type must be highly accurate, since errors can result in inventory imbalances and in pricing errors.

The most likely schemes for coding inventory items and the like are bar codes in which a series of bars of varying widths are separated by spaces of varying widths. In a width-modulated coding scheme, the width of the bar and space elements determine whether a given element represents a "one" or a "zero" data element. In an alternative coding scheme, the presence or the absence of a bar in each of several uniform-width regions indicates whether the region represents a "one" or a "zero" data element. Both of these schemes have been proposed in the past, and systems utilizing both of these schemes have been reduced to practice.

If a mechanically-driven bar-code scanning device is used to scan the bar code at a constant velocity, and if the width of the bar-code elements is known in advance, then it is known in advance how long it takes to scan each element. This advance knowledge may be used to design an internal timing system which may be used to analyze the data which is collected during a scan.

At present, the most successful system for scanning a bar code on goods or inventory items involve the use of a hand-held stylus or scanning pen which is drawn manually back and forth across a bar code. There is no simple way to control the speed of such a manual scan. Indeed, there is no way to insure that the speed of such a scan does not change in mid-scan. Such manual scanning systems, of necessity, must extract scan timing signals from the bar code itself. The problem of generating timing signals in synchronism with a manual scan is the most difficult problem facing the designer of such a system.

One solution to this problem is to have uniformly-spaced bar elements positioned upon the record adjacent the bar code and to provide a double-headed scanning stylus which is capable of scanning both sets of bars at the same time. Systems of this type, which have been proposed for use in the scanning of bar codes on the sides of railroad cars, have proved infeasible for use in certain inventory control systems because they require an employee to position manually the scanning stylus with one scanning head over the information-bearing bar code. Even assuming that an employee can be trained in the use of such a stylus, an additional difficulty arises in that the uniformly-spaced bars and the information-bearing bars typically have to be critically positioned with respect to one another. If the uniformly-spaced bars and the information-bearing bars are misaligned with one another, then the internal system timing can be thrown off to the extent that a data bar is interpreted as a space or vice versa due to the system testing for the presence or absence of a data bar at the wrong moment in time. At its best, a bar-coding arrangement of this type takes up twice the area on a record that is occupied by the information-conveying code elements and thus cuts in half the information which may be recorded upon a given-size record.

Another bar coding system which is self-clocking and which has proved highly successful is one in which the widths of the bars and of the spaces separating adjacent bars are varied. In one such code, a single character is represented by four bars and three intervening spaces, and at least one of the bars and at least one of the spaces is wider than the other bars and spaces which comprise each character. This system contemplates that each character is scanned individually and that the time required to scan each element of a character is measured and recorded. The measured time intervals may then be compared to determine which bars and spaces are wider and which are narrower. The character which a given group of four bars and three spaces represent may then be readily determined by a suitable decoding scheme. This system has proved highly successful in practice and has proved to be quite immune to error, even when used by inexperienced employees. However, this system requires electronic decoding circuitry to measure the relative widths of the bar-code elements of each character and to decode the relative width measurements into binary code.

BRIEF SUMMARY OF THE INVENTION

Accordingly, a primary object of the present invention is to develop a bar coding scheme which is self-clocking in that both bar and space information and also timing information are captured by a single stylus during a single scan.

Another object of the present invention is to produce a bar coding scheme which is somewhat tolerant of sloppiness in the printing of the bars and which is not prone to error due to minor variations in the widths of the bars.

A further object of the present invention is to provide a bar coding scheme in which the presence or absence of a bar signifies a "one" or a "zero" data bit and in which the bar code elements are of equal width.

Another object of the invention is to provide a system which uses relatively simple logic circuitry to control the accurate scanning of a bar code and which is yet able to produce a highly accurate transfer of the bar code data regardless of the velocity at which a bar code is scanned and even if the velocity of scan changes significantly in mid-scan.

In accordance with these and other objects, the preferred embodiment of the invention contemplates printing an information-bearing set of data bars upon a record, tag, or label that is cut from an elongated web, roll or sheet of printable paper which has been pre-printed with a set of evenly-spaced "clock bars." Preferably, the number of clock bars printed upon the web, roll, or sheet per lineal dimension is twice the number of the bar code elements that are printed upon the tags or labels per lineal dimension so that each data bar is printed over no less than one and as many as three leading or trailing edges of the clock bars. The present invention contemplates that the data bars and the clock bars are to be parallel but may otherwise be randomly disposed with respect to one another. Preferably, so that the clock and data bars may be readily distinguished from one another, the two types of bars are printed upon the record using inks having different light-reflective or light-emission frequencies so that the clock bars reflect or emit light that is of a different color than the light that is reflected or emmitted by the data bars. The bars may be printed using ink that flouresces only when illuminated with ultraviolet light, and the bars may thus be invisible to the naked eye when not so illuminated.

The present invention contemplates using a single stylus of generally conventional design to scan manually the bar code elements. This stylus includes a source of illumination for the record and means for conveying light reflected from or emitted by the data and clock bars back to a pair of light detectors each of which is sensitive to a different frequency or wavelength of light. One of the detectors generates a signal whenever a clock bar is positioned opposite the scanning stylus. The other detector generates a signal whenever a data bar is positioned opposite the scanning stylus. The two detectors thus generate first and second data signals.

These two data signals are analyzed by a relatively simple logic network which determines the information that is presented by the data bars. Depending upon the precise relative positioning of the clock bars and the data bars upon the record, and also upon the precise width of the data bars, each individual data bar in a given character may cover anywhere from one to three clock-bar leading and trailing edges. The present invention contemplates sampling the state of the data bar detector signal each time the leading or trailing edge of a clock bar is encountered, as is indicated by a fluctuation of the clock bar detector signal. As a first data bar in a character is scanned, the number of leading and trailing edges of clock bars which are encountered during the scanning of that first data bar are counted. The present invention then assumes that a similar number of clock bar leading and trailing edges will be encountered during the scanning of all other valid data bars within the same character. A test of the data bar detector signal is carried out at corresponding clock bar leading and trailing edge locations which may underlie data bars that are part of this same character. If a data bar is encountered, a binary "1" output signal is generated. A binary "0" output signal is generated if a data bar is not encountered at a location where a data bar could have been printed upon the record. In this manner, the presence or absence of data bars along the record is interpreted as a binary "1" - "0" code in a manner that is entirely independent of both the speed at which the reocrd is scanned and of the inter-character spacing. The simple logic that is used to analyze the detector signals takes into account the possibility that certain clock bar leading and trailing edges may be adjacent the edges of the data bars and may thus cause fluctuations of the clock bar detector signal to occur at times when the data bar detector signal is also in a state of flux and is thus not a reliable indication of the presence or absence of a data bar. The logic either does not sample the data bar detector signal at such times or else it uses the results of such a sampling only to double-check other more reliable samplings.

An alternate embodiment of the present invention contemplates that several different data bar codes may be superimposed upon a single record containing a single set of clock bars and that each of these data bar codes may be printed using a different color ink having different light emitting or reflecting characteristics. This embodiment of the invention contemplates capturing a plurality of light reflection or emission signals simultaneously using a single scanning pen and during a single scanning operation. These and other features of the invention, together with numerous additional objects and advantages of the invention, are apparent in the detailed description which follows. The features of novelty which characterize the invention are pointed out with particularity in the claims annexed to and forming a part of this specification.

BRIEF DESCRIPTION OF THE DRAWINGS

For a better understanding of the invention, reference will be made to the drawings wherein.

DESCRIPTION OF THE PREFERRED EMBODIMENT

The preferred embodiment of the invention has two facets. The first facet relates to the preparation of a bar-coded, machine-readable record, tag, or label. The second facet relates to the design of an apparatus for scanning the record, tag, or label; for sychronously reading data from the record, tag, or label; and for interpreting the results of the scanning process.

Figure 1:
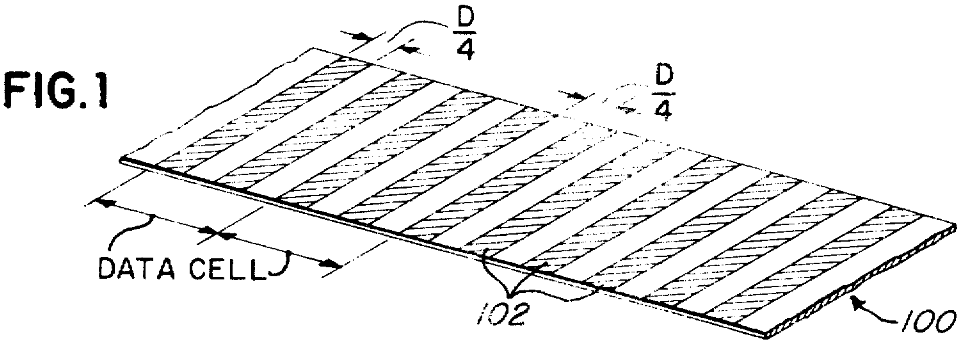
FIG. 1 illustrates a web or sheet which has been preprinted with clock bars spaced apart from one another by a distance equal to one-half the width of a standard bar-code data cell.

The present invention contemplates superimposing a bar code upon records, tags, or labels which are cut from an elongated web or roll or from a sheet, or which are printed directly upon a box or like printable object. The web, roll, sheet, box, or what have you is initially pre-printed with clock bars or the like whose purpose is to synchronize or time the scanning of the bar code. With reference to FIG. 1, a sheet, web, or other suitable printable record 100 upon which the bar codes are ultimately to be printed is initially pre-printed with uniformly spaced, parallel clock bars 102 using phosphorescent ink. These clock bars may be invisible to the naked eye. The clock bars 102 flouresce when illuminated by a proper source of illumination, such as infrared or ultraviolet radiation, and emit light radiation of a characteristic frequency. It is contemplated that individual tags, labels, or records are cut or otherwise separated from the preprinted sheet or web at the time the tags, labels, or records are individually printed. (Hereinafter, the term "record" may be taken as including tags, labels, and the like.)

The bar code (104 in FIG. 2) comprises a plurality of bars which are printed in selected uniform-width "data cells" upon the record. If a cell contains a data bar, the cell is said to contain a "1" data bit. If a cell does not contain a data bar, it is said to contain a "0" data bit. FIG. 1 illustrates the location of two data cells upon the record 100. In the preferred arrangement, two clock bars 102 are included within each data cell. Each clock bar 102 is precisely one-fourth the width of each data cell, and the spaces between adjacent clock bars 102 are also precisely one-fourth the width of each data cell. The data bars are one-half as wide as data cells, as is apparent in FIG. 2. Preferably, the data bars are printed using a phosphorescent ink that flouresces and emits light radiation at a different characteristic frequency than that emitted by the clock bars. When properly illuminated, the clock bars emit light of a different color than that emitted by the data bars.

So long as the data bars 104 are basically parallel to the clock bars 102, they may be printed in any desired position upon the record 100. The fact that the data bars and clock bars do not have to be oriented precisely with respect to one another means that the equipment which prints the data bars upon the record does not have to position the data bars precisely in relation to the clock bars. Records may be pre-printed with clock bars by a first machine and may be printed with data bars at a later time by a second machine.

Figure 2:
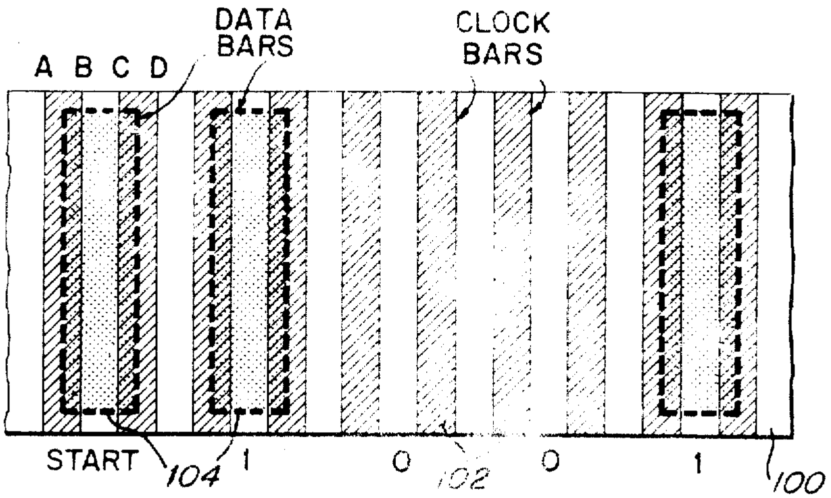
FIG. 2 illustrates one possible positioning of data bars upon a record, tag, or label and illustrates how a set of information-bearing data bars may be superimposed upon a set of clock bars.

The preferred embodiment of the invention contemplates checking for the presence or absence of data bars at locations that correspond to the leading and trailing edges of the clock bars. In FIG. 2, checks for the presence or absence of a data bar typically are carried out at the leading and trailing edges labelled A, B, C, and D and at corresponding leading and trailing edges displaced from the labelled edges by integer multiples of the width of a data cell (see FIG. 1). In FIG. 2, the checks at the trailing edge B and at the leading edge C reveal the presence of a data bar, while checks at the leading edge A and at the trailing edge D do not reveal the presence of a data bar. Checks at corresponding leading- and trailing edges displaced from the edges B and C by the integer multiples of the width of a data cell may be carried out to determine whether or not a data bar is present within each data cell on the record shown in FIG. 2. Checks at the leading edge A and at the trailing edge D, and similar checks at edges displaced from the edges A and D by integer multiples of the width of a data cell, can never indicate the presence or absence of a data bar within a data cell and are of no value. However, if the data bars were shifted to the left or to the right upon the record, then checks at the leading edge A or at the trailing edge D and at corresponding locations in other data cells could become meaningful. Since it is not known in advance precisely where the data bars are to be positioned upon any given record, it is necessary to initially check at each of the edges A, B, C. and D to determine the positioning of a first data bar within a cell. Once a single bar has been located, it may then be presumed that all other bars upon the same record are similarly positioned within their respective data cells. Therefore, only those clock bar edges have to be checked which are positioned where a bar code is likely to be printed. With reference to FIG. 2, checks need to be carried out only at the clock bar edges within each data cell corresponding to the edges labelled B and C.

Figure 4:
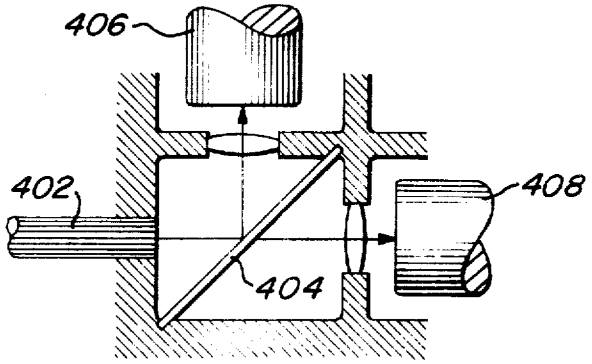
FIG. 4 illustrates a color separating optical apparatus which may be used in conjunction with a conventional fiber-optic scanning stylus to separate different-frequency light signals recovered by the stylus and to supply the light signals to individual light sensors.

It is contemplated that a bar code in accordance with the present invention can be scanned by means of a single hand-held light pen or stylus. The stylus may, for example, include a first fiber optic system for conducting light from a source of illumination to the record and a second fiber-optic system for conducting reflected light back from the record to some form of light sensing apparatus. When the stylus is drawn across the record, the light supplied by the first fiber-optic system causes the clock and data bars to flouresce and to radiate light which is captured by the second fiber-optic system. The second system 402 supplies the light to an optical apparatus shown in FIG. 4 which includes a dichroic mirror 404 and a pair of photomultiplier light sensors 406 and 408. The dichroic mirror separates the light emitted by the clock bars from that emitted by the data bars by reflecting the light emitted by the data bars into the light sensor 406 and by transmitting the light emitted by the data bars to the light sensor 408. The characteristics of the dichroic mirror are selected to reflect light whose frequency corresponds to clock-bar light emissions and to transmit light whose frequency corresponds to data-bar light emissions. A suitable dichroic mirror light separation arrangement is that commonly used in the construction of color television cameras to separate a light signal into three separate components.

Assuming that the invention is in operation and that a record is being manually scanned, the light sensor 408 emits data bearing fluctuating electrical impulses which may be collectively called a data information signal and which correspond to the periodic appearance of data bars under the stylus. The other light sensor 408 emits uniformly spaced fluctuating electrical impulses which may be called a clock signal and which correspond to the periodic appearance of clock bars under the stylus. The clock signal is fed into a logic circuit 500 that appears in FIG. 5. The circuit 500 generates separate A, B, C, and D timing pulse signals which indicate when the stylus is passing the A, B, C, and D edges on the record or corresponding edges displaced from the edges A, B, C, and D by multiples of the width of a data cell. The pulse signals A, B, C, and D are plotted as functions of time in FIG. 10. Collectively, the pulses comprising the signals A, B, C, and D may be called timing clock pulses. A timing clock pulse appears when the leading and trailing edge of each clock bar is manually scanned.

Figure 3:
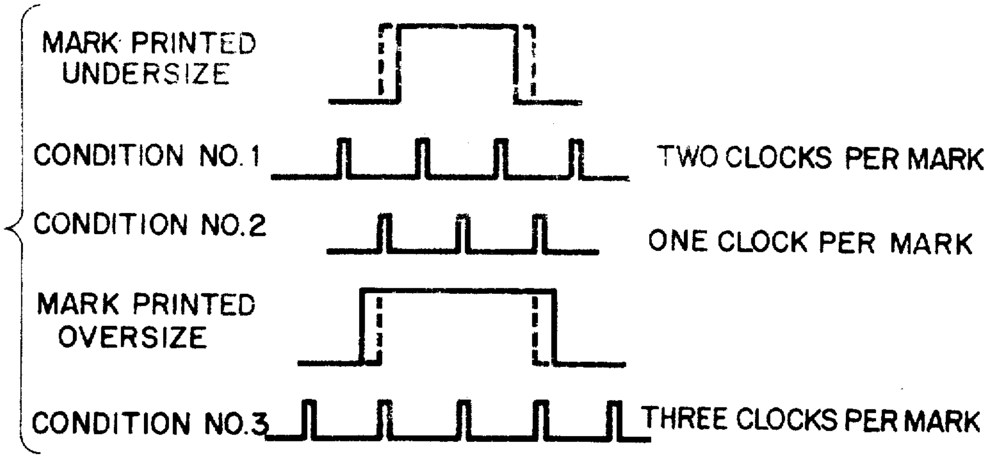
FIG. 3 is a diagram illustrating how a given data bar may encompass anywhere from one to three clock pulses generated synchronously with the scanning of clock bar leading and trailing edges.

FIG. 3 illustrates various possibilities for the relative positioning of the data bars with respect to the clock bars and illustrates the relationship between the fluctuations of the data information signal and the occurrences of the timing clock pulses that results from the scanning of variously positioned data bars of varying widths.

Figure 10:
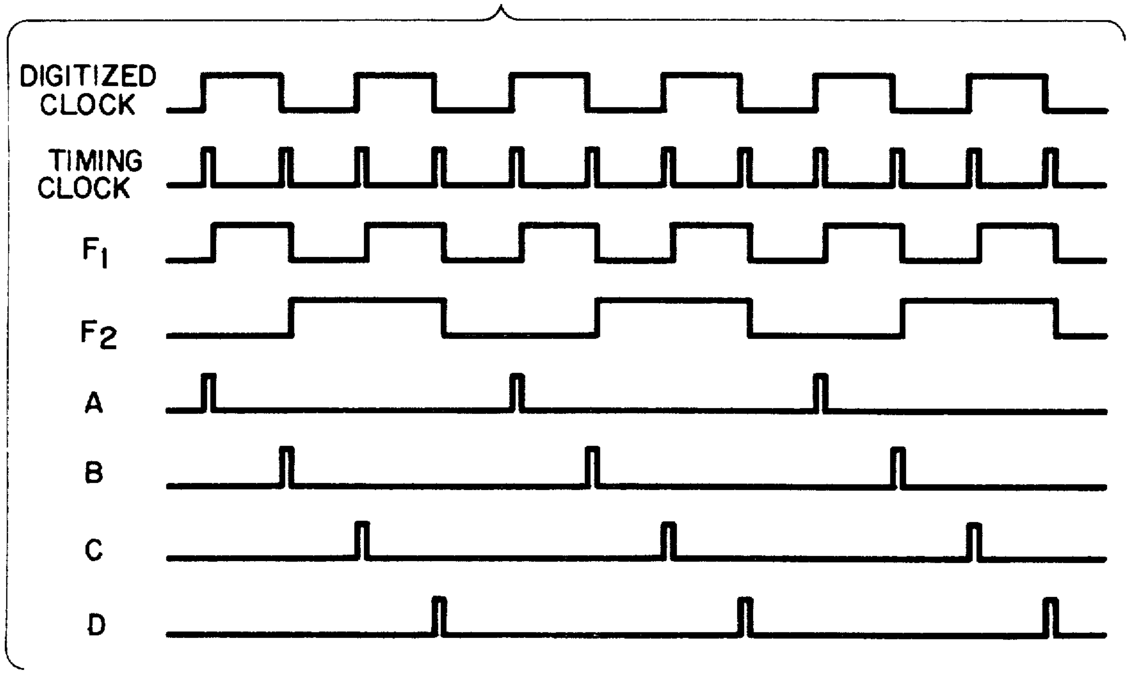
FIG. 10 is a timing diagram illustrating the operation of the synchronous clock which appears in FIG. 5.

A typical fluctuation of the data information signal in response to the scanning of a data bar appears in FIG. 3 labelled "mark printed undersize." Condition No. 1 in FIG. 3 illustrates the timing clock pulses when the data bars are precisely positioned above the clock bars, as in FIG. 2, or above the space between adjacent clock bars. The data information signal fluctuation representing a data bar encompasses two adjacent timing clock pulses in this case. The timing clock pulses on either side of the two encompassed pulses are not encompassed by the data information signal fluctuation. With reference to FIG. 10, only two of the pulse signals A, B, C, and D would then supply pulses at times when a data bar is being scanned. These two pulse signals may be used to strobe significant data from the data information signal, while the remaining two pulse signals may not be used to strobe any significant data from the data information signal.

If a data bar is centered directly over the leading or trailing edge of a clock bar, then the timing clock pulses are as illustrated at conditions number 2 and 3 in FIG. 3. In this case, the data information signal fluctuation representing a data bar may encompass anywhere from one to three timing clock pulses, as is illustrated in FIG. 3. If the printing and/or the scanning of the data bars is such that the fluctuation is narrower than a time interval corresponding to the scanning of one-half a data cell, then only a single timing clock pulse is encompassed by the fluctuation (compare "Condition No. 2" to "mark printed undersize" in FIG. 3). If the printing and/or the scanning of the data bars is such that the fluctuation is wider than such a time interval, then three timing clock pulses may be encompassed by the fluctuation (compare "Condition No. 3" to "mark printed oversize" in FIG. 3). Depending upon the circumstances, anywhere from one to three of the signals A, B, C, and D may be useful in detecting the presence or absence of a data bar within each data cell.

It may be seen from the above discussion that by superimposing wide data bars over narrower clock bars it is possible to generate strobing signals which may be used to detect the presence or absence of data bars within equal-width data cells of a record. When the first data bar of a given character is scanned, logic circuitry 600 (FIG. 6), which is described below, carefully monitors the signal outputs of the two light sensors 406 and 408 and determines the precise relationship between the positioning of the data bars and the positioning of the clock bars. More particularly, this logic circuitry determines whether condition No. 1, condition No. 2, or condition No. 3 exists and also determines which of the four pulse signals A, B, C, and D in FIG. 10 are actually useful in detecting the presence or absence of bar codes within the data cells. As the remaining data bars of the same character are scanned, this logic then responds only to those of the signals A, B C, and D which are useful in strobing the data information signal for the presence of fluctuations corresponding to data bars. As the presence or absence of data bars is thus determined, corresponding "one" or "zero" data bits are stored within a register 602. After a predetermined number of such bits have been stored within the register 602, the contents of the register are transferred to a data storage or utilization device, for example, a digital computer. In this manner, the character depicted in FIG. 2 can be manually scanned using a hand-held stylus, and the data presented by the character can be captured and transferred to a utilization or storage device.

Figure 7:
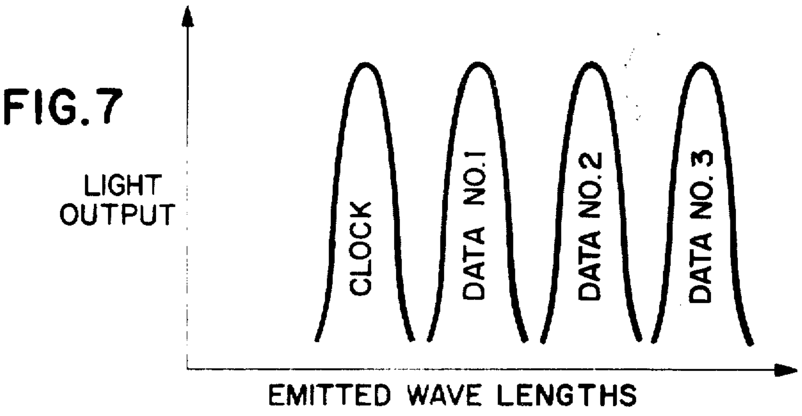
FIG. 7 illustrates how light falling into four different frequency ranges may be reflected from three different sets of data bars and one set of clock bars printed upon a single record, tag, or label so that a clock signal and three separate data signals may be simultaneously extracted during a single scan of a single record.
Figure 8:
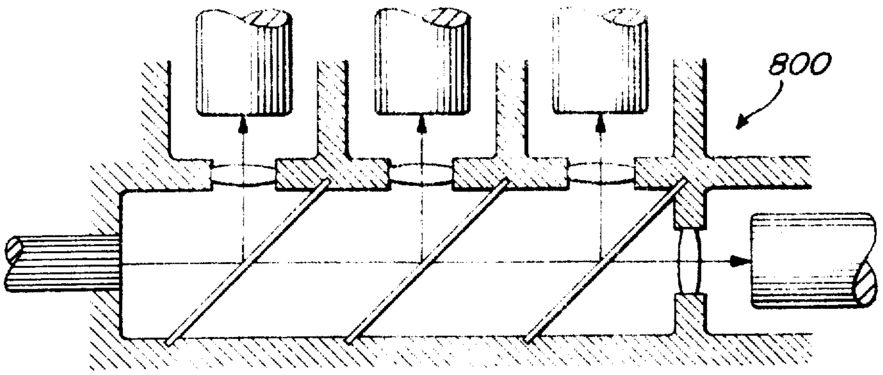
FIG. 8 illustrates an optical system which may be used to separate out into four different frequency ranges light that is recovered by a conventional scanning stylus using a fiber-optic light gathering arrangement.

The embodiment of the invention just described utilizes only a single set of data bars which are printed upon a record. It is also possible to implement the invention with plural sets of data bars printed upon a single record. Each data bar set is printed using an ink whose reflecting characteristics or phosphorescence differs from that of the other inks used to print the other data bar sets and the clock bars upon the same record. In place of the apparatus shown in FIG. 4, it is then necessary to provide a more sophisticated light-signal-separation apparatus such as that shown in FIG. 8. The apparatus 800 in FIG. 8 is able to separate a plurality of different colored reflections or emissions from one another using a plurality of dichroic mirrors and sensing devices. As an example, three different information-bearing bar codes may be printed upon a single record bearing a single set of clock bars. When illuminated by a source of illumination, it is essential that each of these bar codes and the clock bars emit or reflect light of a different wavelength, as is illustrated in FIG. 7. The resultant luminous signal is analyzed by the device shown in FIG. 8, and four independent electrical signals are generated by four light sensing devices. These four signals are then fed into the analyzing logic illustrated in FIG. 9. In this manner, four times the amount of information may be stored upon a given record than would otherwise be possible without decreasing the spacing between adjacent bars and spaces or without increasing the size of the record.

Figure 5:
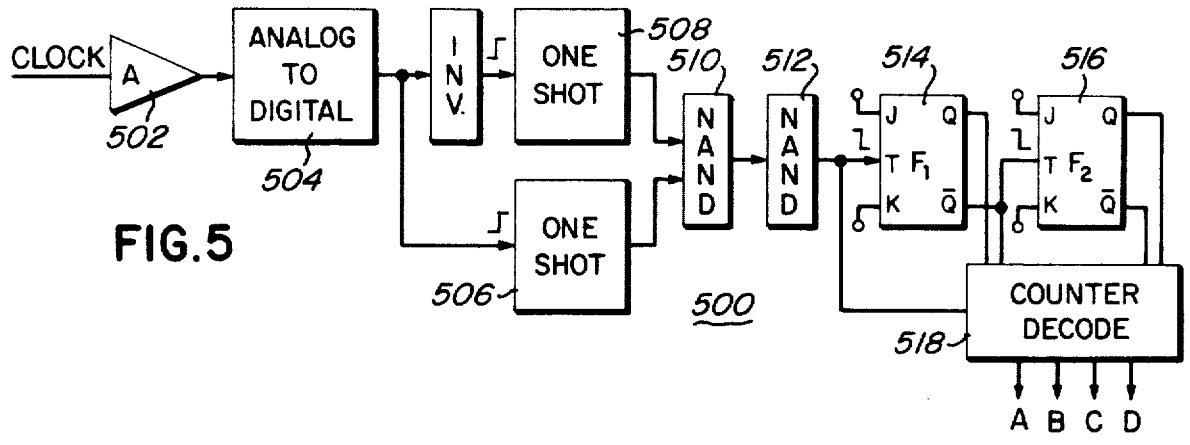
FIG. 5 illustrates a synchronous clock which may be used to generate a series of four time-sequenced pulses each of which corresponds to the leading or trailing edge of a clock bar upon a record that is manually scanned.
Figure 6:
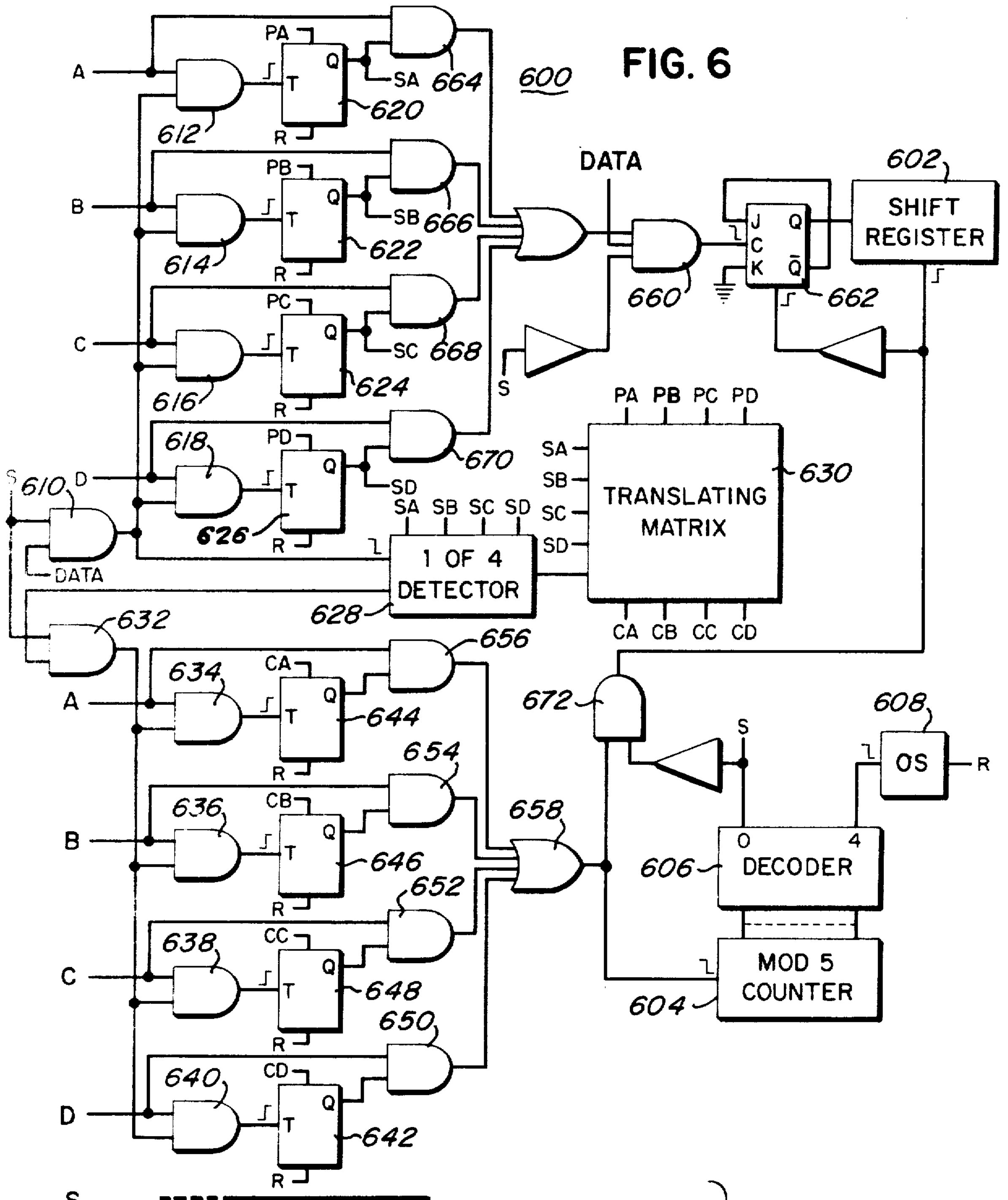
FIG. 6 is a partly logical and partly block diagram of decoding logic which may be used to analyze the signals presented by the two light sensors which appear in FIG. 4.
Figure 11:
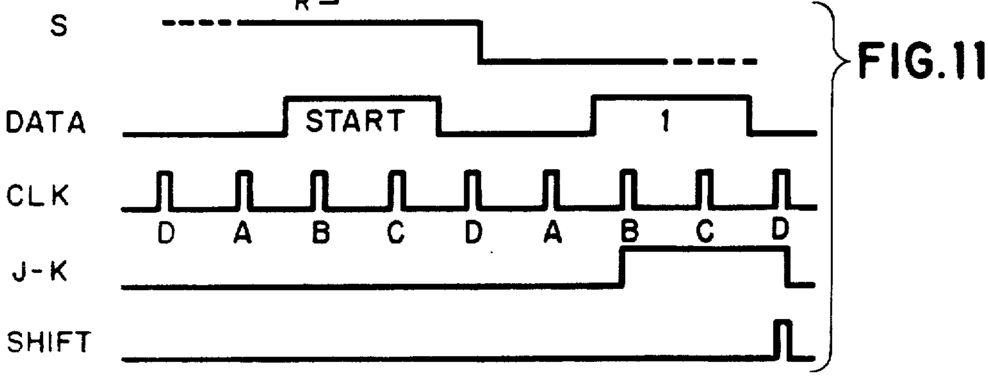
FIG. 11 is a timing diagram illustrating the operation of the decoding logic which appears in FIG. 6.

Having now described in general terms how the invention is carried out, there remains the task of setting out a detailed description of a suitable circuit for analyzing the data information signal and for extracting from that signal the information which it presents. FIGS. 5 and 6 illustrate a suitable set of circuits which may be used to analyze the data information signal, and FIGS. 10 and 11 present a set of timing diagrams which illustrate the operation of these two circuits. Conventional AND, OR, NOT, and NAND logic elements are used to illustrate the details of this circuit, along with block representations of other conventional circuit elements. Each logic element represents a logical function that is to be carried out by any suitable circuit having the same or similar logical characteristics. For example, when an AND gate is shown, it is to be understood that any circuit capable of performing an AND-logic function may be used in place of the AND gate so long as care is taken that the input and output signals are always inverted so as to be properly processed.

In FIGS. 5 and 6, a number of flip-flop devices are shown and are indicated by the letter Q appearing at the upper right-hand corner of a vertically-oriented small rectangle. These are conventional flip-flops and JK flip-flops which have the following operating characteristics: A high-to-low transition at the toggle or T input of a JK flip-flop or a low-to-high transition at the toggle input to a non-JK flip-flop causes the flip-flop to change its state if it has no J and K leads or if both the J and the K leads are clamped to a positive potential level; a positive-to-negative transition at the T input to a flip-flop in which the J input is high and the K input is at ground causes the Q output of the flip-flop to go high, and such a transition causes the Q output to go low if the K input is high and the J input is at ground; the Q output of a flip-flop may be set high by means of a signal entering the upper edge of the flip-flop, while the Q output of a flip-flop may be set low by means of a signal entering the lower edge of the flip-flop; and finally, the $\overline{Q}$ output of the flip-flop is always low when the Q output of the same flip-flop is high, and vice versa.

Other logic gates are conventional in their mode of operation. For example, in FIG. 6, a triangular-shaped gate represents a NOT or inverting gate in which the pointed output of the gate is always high when the gate input along the flat edge of the gate is low, and vice versa. In FIG. 6, a D-shaped gate is an AND gate whose output at the curved end of the gate is high only if both of the gate inputs along the flat edge of the gate are also high. In the same figure, an OR logic gate is an arrow-shaped gate having a single output at the point of the arrow which is low if, and only if, all of the gate inputs entering the curved tail of the arrow are low. In FIG. 5, the NAND logic elements generate an output signal to the right which is low if, and only if, all of the signals entering the elements from the left are high. A gate labelled INV. in FIG. 5 is actually a NOT logic gate similar to the triangular gates shown in FIG. 6 in its operating characteristics. The ONE SHOT devices in FIG. 5 are one-shot multivibrators which generate a pulse output in response to a low-to-high level incoming signal fluctuation and which are used to generate pulses synchronously with the leading or trailing edge of a signal. The triangular amplifier labelled A in FIG. 5 is a conventional analog amplifier which linearly amplifies analog signals without substantially changing their form. For example, the amplifier A might be an integrated circuit operational amplifier.

With that brief introduction, the logic circuits of FIGS. 5 and 6 may now be described. The circuit shown in FIG. 5 will be described first.

When a record such as that shown in FIG. 2 is scanned, the light emissions or reflections of the clock bars are transferred over the second fiber optic system 402 (FIG. 4) to the light sensor 406 and cause that sensor to generate the clock signal. The clock signal is an analog signal that fluctuates up and down as the stylus is drawn over the clock bars. The clock signal is fed into the logic circuitry 500 shown in FIG. 5 and is initially amplified to an acceptable level by an analog amplifier 502. The analog output of the amplifier 502 is fed into a conventional analog-to-digital converter 504. The converter 504 determines what analog signal level corresponds to the scanning of clock bars and what analog signal levels correspond to the scanning of the spaces between clock bars. The converter 504 generates a two-state, binary output signal in accordance with whether a clock bar or the space between adjacent clock bars is being scanned. The output signal of the converter 504 is called the digitized clock signal and is depicted in FIG. 10. The digitized clock signal is similar to the clock signal but is a pure rectangular waveform. The converter 504 may simply be a Schmitt trigger circuit. If desired, the clock signal may be fed into the Schmitt trigger circuit through a capacitor, and a pair of clamping diodes may connect the end of the capacitor nearest the Schmitt trigger to positive and negative clamping potential references to cancel out any drift that may be present in the analog clock signal. Other types of converters may also be used.

The digitized clock signal is fed into a one-shot multivibrator 506. This signal is also inverted and fed into a one-shot multivibrator 508. The multivibrators 506 and 508 respond to fluctuations of their input signals by generating output pulses in synchronism with the leading edges of their input signals. When the digitized clock signal goes high, the one-shot multivibrator 506 generates an output pulse. When the digitized clock signal goes low, the one-shot multivibrator 508 generates an output pulse. The outputs of the one-shot multivibrators 506 and 508 are normally at a high level, so the pulses that appear at the output of the multivibrators are negative-going pulses. The pulses from both multivibrators are fed into a NAND gate 510 the output of which is normally at a low level. In response to a negative-going pulse from either of the one-shots 506 or 508, the NAND gate 510 generates a positive-going output pulse which may be called a timing clock pulse. FIG. 10 illustrates that a timing clock pulse occurs each time the digitized clock signal supplied by the converter 504 changes its state. The timing clock pulses are the strobe pulses which are used to strobe the data information signal whenever it is to be determined whether a data bar is present beneath the stylus. A NAND gate 512 inverts the timing clock pulses.

The inverted timing clock pulses are fed into the toggle or T input of a first JK flip-flop 514. The inverted or $\overline{Q}$ output of the flip-flop 514 is fed into the toggle or T input of a second flip-flop 516. Thus connected, the two flip-flops 514 and 516 function as a ripple counter and respectively generate the output signals F1 and F2 which are illustrated in FIG. 10. A counter decode circuit 518 routes each inverted timing clock pulse which flows from the NAND gate 512 to one of the four signal lines A, B, C, or D in accordance with the state of the two flip-flops 514 and 516. The counter decode logic 518 is thus a simple steering logic that is controlled by the states of the two flip-flops. Since the flip-flops can enter any one of four possible states (both set, both reset, one set and the other reset, and one reset and the other set), and since the state of the flip-flops is altered by each timing clock pulse, successive pulses are supplied to different ones of the four signal lines A, B, C, and D. The pulses supplied to the lines A, B, C, and D are illustrated in FIG. 10. In a given series of four timing clock pulses, the first is directed to the line A, the second to the line B, the third to the line C, and the fourth to the line D. The next pulse in a continuous series of pulses is again routed to the line A, and so on.

With reference to FIGS. 1 and 2, the timing of four successive pulses on the lines A, B, C, and D correspond to the leading and trailing edges of two successive clock bars and covers a time interval which corresponds to the width of a single data cell. The pulses A, B, C, and D are used to strobe the data information signal that is generated by the light sensor 408.

The logic circuitry shown in FIG. 6 is used to analyze the data information signal generated by the light sensor 408. As has been explained, the data information signal goes high and low in accordance with whether the scanning stylus is above a data bar or above the space that separates two data bars. This signal is amplified and is digitized by circuitry which is not shown but which may be identical to the amplifier 502 and the converter 504 shown in FIG. 5. As a result of the digitizing process, a DATA signal is generated which is at a high level whenever a data bar is being scanned and which is at a low level whenever the space between bars is being scanned. The data signal is a digital signal, but it resembles in shape the analog data information signal. A representation of how the DATA signal varies with time is presented in FIG. 11.

In FIG. 6, the DATA signal is analyzed for its data content and the data is stored within a shift register 602. A counter 604 counts the data bits which are fed into the shift register 602 and causes a one-shot multivibrator 608 to generate a pulse R when a complete four-element character code has been loaded into the shift register 602. The counter 604 is a MOD-5 counter which may enter five states that may be numbered from zero to four and then resets to the first state. The decoder 606 generates an output signal S when the counter 604 is in the zero or reset state and generates an output signal "4" for the one-shot multivibrator 608 when the counter is in its fourth state. The one-shot multivibrator 608 is designed to toggle upon the trailing edge of the "4" signal when the MOD-5 counter 604 is reset after reaching its maximum count. During the scanning of five-bit bar code characters (four data bits plus a "start" data bar), four data bits are loaded into the shift register 602 as the counter 604 advanced from state to state. The loading of the fourth data bit into the shift register 602 is accompanied by a resetting of the counter 604 and thus by the generation of an R pulse. Some form of utilization device (not shown in the figures) responds to this R pulse by retrieving the four data bits from the shift register 602 and by either storing them or feeding them on to a computer or other utilization device.

The circuitry shown in FIG. 6 begins initially with the counter 604 in its zeroth state and with the decoder 606 generating an S output sugnal. This S output signal enables a gate 610 to pass the DATA signal to the inputs of four AND gates 612, 614, 616, and 618, each of which is strobed by one of the four pulse signals A, B, C, and D. When the stylus encounters the first data bar of a character, the DATA signal goes high, as does the output of the gate 610. The gates 612, 614, 616, and 618 are then enabled to pass the successive timing pulses A, B, C, and D which occur during the scanning of this first data bar to the toggle inputs in the flip-flops 620, 622, 624, and 626. If the data bars are positioned as is shown in FIG. 2, then B and C timing pulses occur and set the respective flip-flops 622 and 624 while this first data bar is being scanned. The flip-flops 620 and 626 then remain cleared, since the DATA signal is low at the time when the signal pulses A and D are generated. If the data bars were positioned over just one of the edges A, B, C, and D in FIG. 2, then only one of the flip-flops 620, 622, 624, and 626 would be set. If the data bars were positioned over three of the edges in FIG. 2, then three of the flip-flops 620, 622, 624, and 626 would be set.

When the DATA signal again goes low, the output of the gate 610 also goes low and triggers the "1 of the 4 detector" logic 628. The logic 628 senses the states of the four flip-flops 620, 622, 624, and 626 and generates signals in accordance with whether only one of the flip-flops has been set or whether more than one of the flip-flops have been set. If only one of the flip-flops has been set, the detector 628 enables the translating matrix 630 to function as is explained below. If more than one of the flip-flops have been set, the detector 628 supplies an enabling signal to a gate 632. This gate has as a second input the signal S generated by the decoder 606.

An output signal is then generated by the gate 632 which partially enables the gates 634, 636, 638, and 640. These gates have as their inputs the respective pulse signals A, B, C, and D.

The next pulse signal which supplies a pulse to the logic shown in FIG. 6 sets a corresponding flip-flop in the lower portion of FIG. 6. For example, if the character being scanned is in accordance with FIG. 2, then the first pulse which occurs after the first bar has been scanned is a pulse D. This pulse passes through the gate 640 and sets a flip-flop 642. If the data bars were shifted in FIG. 2, then the next occurring pulse could be an A, a B, or a C pulse, in which case one of the corresponding flip-flops 644, 646, or 648 would be set. In FIG. 6, the flip-flops 642, 644, 646, and 648 are designed to be set in synchronism with the leading edge of the A, B, C, and D pulse. The output of the flip-flop that is set partially enables one of the gates 650, 652, 654, or 656. The other input to the same gate is also supplied with the pulse signal, so the gate 650, 652, 654, or 656 is fully enabled to generate an output signal. This output signal passes through an OR logic gate 658 and advances the MOD-5 counter 604. For example, if a D pulse is the next to occur, the leading edge of this D pulse sets the flip-flop 642 so that the AND gate 650 is enabled to pass the D pulse through the gate 658, and the trailing edge of the D pulse advances the counter 604.

To briefly recapitulate — when the scanning stylus encounters a first data bar in a character, those timing pulses A, B, C, and D which occur during the scanning of that first data bar cause corresponding flip-flops 620, 622, 624, or 626 to be set. These flip-flops then indicate which scanning pulses occur during the scanning of the location within a data cell where a data bar is likely to be found and are therefore significant in interpreting whether a bar is present or absent within any data cell. The first pulse A, B, C, or D to occur after the scanning of the first data bar causes a corresponding flip-flop 642, 644, 646, or 648 to be set and also advances the counter 604 to its first state. The signal S now terminates and prevents the settings of the flip-flops 620, 622, 624, 626, 642, 644, 646, or 648 from being altered until a complete 4-bit character has been scanned.

Assuming that the bar code is in accord with FIG. 2 so that the flip-flops 622, 624, and 642 have been set, the scanning process now continues. The DATA signal which represents the presence or absence of a data bar is now fed through a gate 660 to the toggle input of a set-only flip-flop 662. The gate 660 is enabled by the absence of an inverted S signal at its input and by any of the pulse signals A, B, C, and D which are able to pass through the gates 664, 666, 668, and 670. Since only the gates 666 and 668 are enabled by the corresponding flip-flops 622 and 624, only the pulse signals B and C are permitted to strobe the DATA signal through the gate 660 to the toggle input of the flip-flop 662. The flip-flop 662 is normally left in a cleared state with its Q output terminal low, since it is periodically cleared by the same pulses that advance the counter 604. If the DATA signal is high when either a B or a C pulse is generated, indicating the presence of a data bar within a data cell, then the flip-flop 662 toggles into its set state. A D timing pulse which follows then passes through the gates 650 and 658 to advance the counter 604. This D timing pulse is also passed through a gate 672 that is enabled by the absence of an inverted S signal and advances the shift register 602, thus loading the contents of the flip-flop 662 into the first stage of the shift register 602. The output of the gate 672 is also used to clear the flip-flop 662 back to its initial state when the signal at the output of the gate 672 terminates. In this manner, each possible position at which a data bar might occur is checked at the two locations corresponding to the timing pulses B and C for the presence of a data bar. If a bar is found, the flip-flop 662 is set and a "one" data bit is loaded into the shift register 602. If a data bar is not found, then a "zero" data bit is loaded into the shift register 602. Each time a data bit is shifted into the shift register 602, the counter 604 is advanced until the entire 4-bit character code has been stored within the shift register 602. When the counter 604 returns from full count back to zero count in response to the last data bit in the character reaching the shift register 602, the one-shot multivibrator 608 generates the R pulse which signals that a 4-bit data character is present within the shift register 602 and which also resets the various flip-flops in the circuitry 600. The circuitry is then primed to analyze the next five-data-cell character which may not be carefully spaced from the character just read.

The circuitry shown in FIG. 6 functions in the same manner when the data bars comprising a character overlie three successive transitions of the clock bars, as is illustrated in condition No. 3 of FIG. 3. If the data bars overlie only a single clock bar transition, then the circuitry functions in a different manner. The one-of-four detector 628 does not enable the gate 632 but alternately enables the translating matrix 630 which may be a read-only memory device or its equivalent. The translating matrix 630 has as its inputs the output signals generated by the four flip-flops 620, 622, 624, and 626. The translating matrix 630 generates signals PA, PB, PC, and PD which preset a number of the flip-flops 620, 622, 624, and 626 so as to cause the presence or absence of a bar to be checked at three adjacent locations about the transition which the first data bar overlies. The translating matrix 630 also sets an appropriate one of the four flip-flops 642, 644, 646, or 648 by generating a signal CA, CB, CC, or CD so that the counter 604 is advanced after the third data bar test has been carried out. In net effect, if a data bar overlies a single transition, it is treated just as though it also overlies the two adjoining transitions with the translating matrix 630 setting the proper flip-flops in order to achieve this result. The data gathering process then proceeds exactly as has already been described.

FIG. 11 is a timing diagram illustrating the operation of the circuitry shown in FIG. 6 when a bar code such as that shown in FIG. 2 is scanned. Initially, the S signal is high because the counter 604 is at zero count. The clock pulses A, B, C, and D occur repeditively and sequentially until one or more of these pulses occur during the time when the DATA signal is high, indicating that a data bar is being scanned. The pulses B and C set two of the flip-flops 620 through 626, as has been described. The next successive pulse D after the termination of the data signal terminates the signal S and causes the initiation of the data reading process. Assuming that a data bar is present in the data cell adjacent the data cell containing the first data bar, as is true in FIG. 2, the next successive B pulse and the high-level data signal sets the JK flip-flop 662, as is indicated by the signal "JK" in FIG. 11. This flip-flop is cleared by the next successive D clock pulse that occurs, since that pulse is permitted to pass through the gates 650, 658, and 672 by the set flip-flop 642. The decoding process then continues as has been described until a complete character has been scanned.

Figure 9:
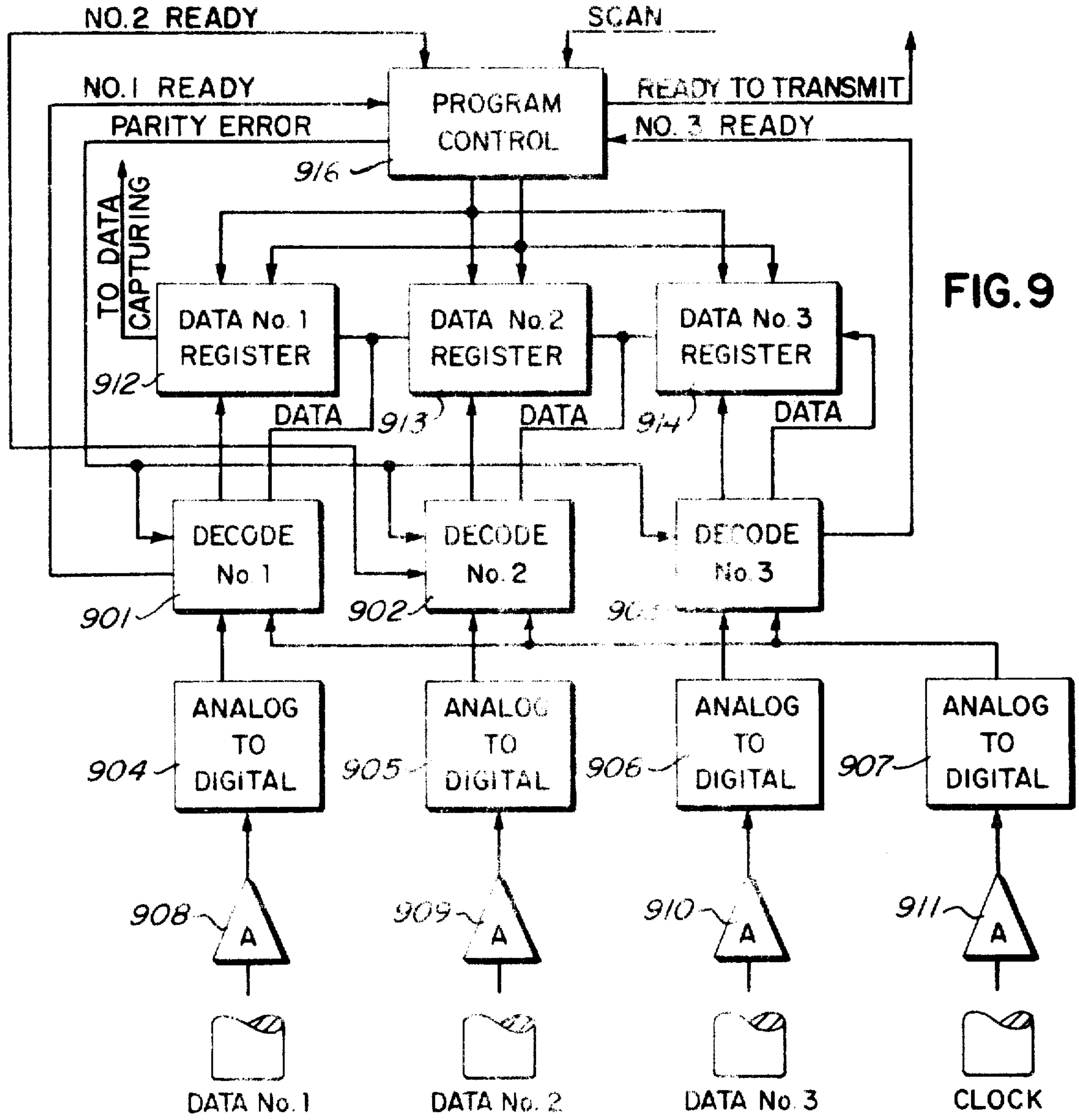
FIG. 9 is a block diagram representation of a system which may be used to simultaneously evaluate the three data bar signals printed upon a record, tag, or label that is scanned using the optical system illustrated in FIG. 8.

The logic circuit shown in FIGS. 5 and 6 is intended for use when only a single set of data bars is superimposed over the clock bars. An alternative embodiment of the invention contemplates that a plurality of data bars may be superimposed over a single set of clock bars. FIG. 9 illustrates a decoding logic system which may be used for such an embodiment of the invention. Separate decoding logic networks 901, 902, and 903, similar in their form to the decoding logic circuit 600 shown in FIG. 6, are provided for each of the printed data bar records, and a separate analog-to-digital converter 904, 905, 906, and 907 and amplifier 908, 909, 910, and 911 is provided for each light sensor signal output that corresponds either to the presence or absence of data bars or to the presence or absence of clock bars at the point upon a record that is being scanned. It is contemplated that all of the logic just described operates continuously and simultaneously to store data in three separate data registers 912, 913, and 914. This entire operation is controlled by a central program control 916 which typically would synchronize the transfer of data from the data registers to some data utilization device — either a computer or a data storage device of some type.

Only the preferred embodiment of the invention has been described, and it is to be understood that numerous modifications and changes will occur to those who are skilled in the art. For example, the inventive concepts are applicable to hybrid optical-magnetic bar-code arrangements. While parallel bars have been illustrated, it is contemplated that the bars may also be concentric or radial in their orientation. It is, therefore, intended by the appended claims to encompass all such modifications and changes as come within the true spirit and scope of the invention.

What is claimed as new and desired to be secured by letters Patent of the United States is:

1. A machine readable record which may be scanned by means of a manually held scanning instrument, said record comprising:

a base material;

a first set of uniformly spaced and parallel bars printed upon said base material and containing a material which, when stimulated by electromagnetic radiation, strongly emits or reflects electromagnetic radiation within a first frequency range; and a second set of bars printed upon said base material on top of and parallel to said first set of bars having a minimum width which is at least twice the width of said first set of bars and which, when stimulated by electromagnetic radiation, strongly emits or reflects electromagnetic radiation within a second frequency range, the spacing and/or width of said second set of bars being varied in such a manner as to convey information.

2. A record in accordance with claim 1 wherein the bars in said second set of bars are of uniform width, wherein subsets of the bars in said second set are spaced basically uniform distances from one another, and wherein selected bars other than the first bar in said subsets are omitted at different positions such that the presence of a bar at a location indicates a "one" data bit while the absence of a bar at a location indicates a "zero" data bit, or vice versa.

3. A system for conveying information from a coded record to a utilization device comprising:

a first bar code comprising uniformly-spaced clock bars printed upon said record;

a second bar code comprising data bars whose width and spacing is at least twice that of the bars in said first bar code printed upon said record such that said clock and data bars are parallel to one another and superimposed upon one another, said first and second bar codes having light emission or reflection properties which differ substantially from one another in the wavelength of the light emitted or reflected, and said second bar code having width and/or position characteristics which vary to convey information in accordance with a predetermined coding scheme;

means for scanning said bar codes along a path which traverses the elements of said bar codes and for capturing illumination emitted or reflected from said bar codes;

means for separating out of the captured illumination a first digital light signal whose wavelength corresponds to light emitted or reflected by the first bar code and a second digital light signal whose wavelength corresponds to light emitted or reflected by the second bar code;

means for converting said first and second light signals into correspondingly fluctuating first and second digital electrical signals; and means for sampling the data content of the second electrical signal at times which correspond to the fluctuations of the first electrical signal, whereby the data content of said data bars may be systematically retrieved from the manually-scanned record.

4. A system in accordance with claim 3 which further includes means responsive to the scanning of a first data bar on a record, as indicated by a first fluctuation of the second electrical signal, for determining which fluctuations of the first electrical signal occur during the scanning of the first data bar as indicated by said second electrical signal, and additional means for checking for the presence of data bars at times corresponding to fluctuations of said first electrical signal which occur at multiples of four fluctuations away from said fluctuations occurring during the scanning of the first data bar.

5. A system in accordance with claim 4 wherein, when only a single fluctuation of said first electrical signal occurs during the scanning of a first data bar as indicated by fluctuations of said second electrical signal, means are provided for checking for the presence of a bar not only at multiples of four fluctuations away from the one fluctuation of said first electrical signal which occurred during the scanning of the bar but also at multiples of four fluctuations away from the fluctuations which preceed and follow said one fluctuation.

6. A system in accordance with claim 3 wherein at least one additional set of data bars is printed upon said record, said additional data bars having properties which reflect or emit light within a third wavelength region, and wherein additional optical and electronic logic is provided for extracting data from the additional set of data bars in the same manner that data is extracted from the first set of data bars using the same clock bars for synchronizing the retrieval of data from all sets of data bars upon the record.

7. A system in accordance with claim 6 wherein three different sets of data bars are superimposed upon a single set of clock bars upon a single record, whereby three simultaneous sets of data may be retrieved from a single record during a single manual scanning operation.

8. A method of transmitting coded data using a printed record member and an optical scanning device comprising the steps of:

pre-printing a plurality of evenly-spaced invisible timing marks having a first optical characteristic which optically distinguishes the marks from the record member upon the record members;

printing groups of plural data marks having a different optical characteristic than said timing marks which optically distinguishes the data marks from the record member and spaced from one another to represent coded information upon the record member superimposed over and parallel to said timing marks;

optically scanning the record to generate a composite optical signal;

separating first and second optical signals from said composite optical signal corresponding respectively to emissions or reflections from said timing marks and said data marks; and sampling the state of said second optical signal corresponding to said data marks at times when said first optical signal corresponding to said timing marks fluctuates to recover from said second optical signal data corresponding to the information carried by the record.

9. A method of printing a scannable code on a sheet of material comprising the steps of:

pre-printing upon a sheet a plurality of evenly-spaced, parallel, invisible timing marks having one characteristic which distinguishes the timing marks from the sheet;

and printing at least one group of coded data marks having a different characteristic from the timing marks and from the sheet superimposed over the timing marks on said sheet, spacing the data marks from one another by at least twice the spacing between said timing marks.

10. A method of making record members from an elongated web comprising the steps of:

providing a web of material;

pre-printing a plurality of evenly-spaced timing marks having one characteristic differing from the characteristic of the web over the length of the web;

printing a plurality of groups of coded data marks having a different characteristic than the timing marks on the web superimposed over the timing marks on said web; and separating the web into individual record members each bearing the timing marks and at least one group of coded data marks.

11. A method in accordance with claim 10 which includes the additional step of spacing the most closely spaced of said coded data marks at least twice as far from one another as said timing marks are spaced from one another, and spacing other of said coded data marks integer multiples of twice the distance between said timing marks from one another.

12. A method of making records, comprising the steps of:

providing record material:

pre-printing a plurality of evenly-spaced timing marks having one characteristic different from the record material characteristic on the record material; and printing a plurality of coded data marks having a different characteristic from the timing marks on the record material superimposed over the timing marks on the record material.

13. A method in accordance with claim 12 which includes the additional step of spacing the most closely spaced of said coded data marks at least twice as far from one another as said timing marks are spaced from one another, and spacing other of said coded data marks integer multiples of twice the distance between said timing marks from one another.

14. A method in accordance with claim 12 which includes the additional step of printing each group of coded data marks representing an individual character in a single operation, printing several such groups upon each record, and spacing the coded data marks within each group integer multiples of at least twice the distance between said timing marks from one another.

15. A method of making record members comprising the steps of:

providing a web of record members;

pre-printing a plurality of evenly-spaced parallel timing marks having one characteristic differing from the characteristics of said record members on all of the record members in the web;

printing upon each separate record member groups of plural data marks having a different characteristic from said timing marks and said record members and representing characters and/or numbers parallel to said timing marks, and spacing the data marks within each group from one another by integer multiples of at least twice the distance between said evenly-spaced timing marks; and separating individual records from the web one-at-a-time.

16. A record comprising:

a record member;

a first uniformly-spaced array of parallel bars positioned on one side of said record member and formed of a material that is reflective or that can be stimulated to emit light within a first light frequency range; and a second array of bars positioned on said one side of said record member parallel to and superimposed upon said first array of bars, said second array of bars formed of a material that is reflective or that can be stimulated to emit light within a second light frequency range that differs from said first light frequency range.

17. The arrangement of claim 16 wherein said first and second arrays are printed on said one side of said record member.

18. The arrangement of claim 16 wherein said first array consists of uniformly-spaced parallel timing bars and said second array consists of data bars superimposed upon said first array.

19. A method of interpreting coded data which is represented by data bars having one optical characteristic superimposed over uniformly-spaced clock bars having a second optical characteristic all of which bars are carried by a record having a third optical characteristic, said method comprising the steps of:

optically scanning the record to generate a composite optical signal;

separating first and second optical signals from said composite optical signal corresponding respectively to light emissions from said clock bars and from said data bars; and sampling the state of said second optical signal corresponding to said data bars at times when said first optical signal corresponding to said clock bars fluctuates to recover from said second optical signal data corresponding to the information represented by said data bars.

* * * * *